United States Patent
Von Bergen et al.

(10) Patent No.: US 9,869,394 B2
(45) Date of Patent: Jan. 16, 2018

(54) SEALING SYSTEM AND SEALING RING

(71) Applicants: SKF BLOHM + VOSS INDUSTRIES GMBH, Hamburg (DE); SKF USA INC., Lansdale, PA (US)

(72) Inventors: Ernst-Peter Von Bergen, Ahlefeld (DE); Carlos Fangauf, Hamburg (DE); Lars Ziemen, Hamburg (DE); Dieter Von Borstel, Guderhandviertel (DE); Ivan Ristic, Hamburg (DE); Guido Wuestenhagen, Hamburg (DE)

(73) Assignees: SKF MARINE GMBH, Hamburg (DE); SKF USA INC., Landsale, PA (US)

( * ) Notice: Subject to any disclaimer, the term of this patent is extended or adjusted under 35 U.S.C. 154(b) by 0 days.

(21) Appl. No.: 15/030,721

(22) PCT Filed: Dec. 5, 2014

(86) PCT No.: PCT/US2014/068744
§ 371 (c)(1),
(2) Date: Apr. 20, 2016

(87) PCT Pub. No.: WO2015/061810
PCT Pub. Date: Apr. 30, 2015

(65) Prior Publication Data
US 2016/0265664 A1    Sep. 15, 2016

(30) Foreign Application Priority Data

Oct. 22, 2013 (DE) .................. 10 2013 017 816
Oct. 22, 2013 (DE) .................. 10 2013 017 817
Oct. 22, 2013 (DE) .................. 10 2013 017 818

(51) Int. Cl.
*F16J 15/322* (2016.01)
*F16J 15/3216* (2016.01)
(Continued)

(52) U.S. Cl.
CPC ......... *F16J 15/3216* (2013.01); *F16J 15/322* (2013.01); *F16J 15/324* (2013.01);
(Continued)

(58) Field of Classification Search
CPC .. F16J 15/3216; F16J 15/3268; F16J 15/3276; B63H 2023/327
See application file for complete search history.

(56) References Cited

U.S. PATENT DOCUMENTS 3,106,405 A * 10/1963 Pringle ................. B21B 31/078
                                                                   277/423
3,501,157 A *  3/1970 Doutt ................... F16J 15/3216
                                                                   277/572
(Continued)

FOREIGN PATENT DOCUMENTS

DE    3526424    2/1987
DE    3714674    5/1987
(Continued)

OTHER PUBLICATIONS

3 German Search Reports, dated Oct. 22, 2013 3 priority documents.
International Search Report, dated Mar. 19, 2015.

*Primary Examiner* — Eugene G Byrd
(74) *Attorney, Agent, or Firm* — Greer, Burns & Crain Ltd.

(57) ABSTRACT

A sealing system for sealing shafts against liquid media, for example propeller shafts, impeller shafts, rudder stocks of ships and the like. Opposing corner regions of the sealing system that are located radially inside of a clamping space, for clamping at least one sealing ring, are formed by inclined run-on surfaces that diverge when viewed radially from the inside towards the outside. For accommodation in the clamping space, a clamping section of the sealing ring (Continued)

comprises two opposite edge regions that are formed by inclined surfaces that correspond to the run-on surfaces.

12 Claims, 5 Drawing Sheets

(51) Int. Cl.
  *F16J 15/3244*    (2016.01)
  *F16J 15/3276*    (2016.01)
  *F16J 15/3268*    (2016.01)
  *F16J 15/3212*    (2016.01)
  *F16J 15/324*    (2016.01)
  *F16J 15/3252*    (2016.01)

(52) U.S. Cl.
  CPC ....... *F16J 15/3212* (2013.01); *F16J 15/3244* (2013.01); *F16J 15/3252* (2013.01); *F16J 15/3268* (2013.01); *F16J 15/3276* (2013.01)

(56) References Cited

U.S. PATENT DOCUMENTS

| | | | | |
|---|---|---|---|---|
| 3,773,336 A | * | 11/1973 | Walter | B63H 23/36 277/551 |
| 3,902,726 A | * | 9/1975 | Hisada | B63H 23/321 277/563 |
| 4,344,631 A | | 8/1982 | Winn | |
| 4,448,425 A | * | 5/1984 | von Bergen | B63H 23/321 277/320 |
| 4,750,747 A | | 6/1988 | Hoelzer | |
| 5,137,116 A | * | 8/1992 | Von Bergen | B63H 23/321 184/104.1 |
| 5,219,434 A | * | 6/1993 | Von Bergen | F16J 15/3456 210/171 |
| 5,308,269 A | * | 5/1994 | von Bergen | F28D 15/02 416/174 |
| 5,374,208 A | * | 12/1994 | von Bergen | B63H 23/321 277/563 |
| 5,411,273 A | | 5/1995 | Pietsch et al. | |
| 8,348,281 B2 | * | 1/2013 | Yoshida | B63H 23/321 277/560 |
| 9,410,627 B2 | * | 8/2016 | Fangauf | B63H 23/321 |
| 2004/0169339 A1 | * | 9/2004 | Bock | F16J 15/3216 277/549 |
| 2011/0140366 A1 | * | 6/2011 | Kirchner | F16J 15/166 277/377 |
| 2013/0307222 A1 | | 11/2013 | Von Bergen et al. | |

FOREIGN PATENT DOCUMENTS

| | | |
|---|---|---|
| DE | 4141999 | 6/1993 |
| DE | 102011018584 | 10/2012 |
| DE | 102012006125 | 9/2013 |

\* cited by examiner

SEALING SYSTEM AND SEALING RING

CROSS-REFERENCES TO RELATED APPLICATIONS

This application claims the benefit of the German patent application No. 10 2013 017 816.9 filed on Oct. 22, 2013, German patent application No. 10 2013 017 817.7 filed on Oct. 22, 2013, and German patent application No. 10 2013 017 818.5 filed on Oct. 22, 2013, the entire disclosures of which are incorporated herein by way of reference.

BACKGROUND OF THE INVENTION

The invention relates to a sealing system for sealing shafts against liquid media, for example propeller shafts, impeller shafts, rudder stocks of ships, as well as to a sealing ring.

Such a sealing system is, for example, shown in DE 41 41 999 C2, in DE 10 2011 018 584 A1, DE 10 2012 006 125 A1 and in U.S. Pat. No. 4,344,631 A. Each of these sealing systems comprises at least one sealing ring and supporting rings on the side of the housing, which supporting rings form a clamping space for clamping the sealing ring. The clamping space is open radially inside relative to a system center axis, by way of an annular gap, for feeding the sealing ring through between the supporting rings. The sealing ring comprises a radially outer clamping section for accommodating, in the clamping space, a radially inner sealing lip for directly or indirectly resting against the shaft, and a connecting web for connecting the sealing lip to the clamping section. While the clamping section is rounded in U.S. Pat. No. 4,344,631 A, the clamping sections of the sealing rings according to the above-mentioned DE printed publications DE 41 41 999 C2, DE 10 2011 018 584 A1 and DE 10 2012 006 125 A1 comprise an essentially rectangular cross section with clamping section surfaces that are oriented so as to be parallel or perpendicular to each other.

However, it has been shown that during installation of the sealing ring the clamping section can be partly squeezed out of the clamping space. Consequently, not only is the clamping section damaged, but also accurate positioning of the sealing ring is impossible. In the case of a round shape the clamping section in the clamping space lacks a non-rotational guide so that the sealing ring tends to be rotated or displaced from its installed desired position.

SUMMARY OF THE INVENTION

It is an object of the invention to create a sealing system for sealing shafts against liquid media, for example propeller shafts, impeller shafts, rudder stocks of ships, wherein the sealing ring of said sealing system can reliably be properly installed and is secured against positional changes in the clamping space. Furthermore, it is the object of the invention to create a sealing ring for such a sealing system.

A sealing system according to the invention for sealing shafts against liquid media, for example propeller shafts, impeller shafts, rudder stocks of ships, comprises at least one sealing ring and supporting rings arranged on the housing side, which supporting rings form a clamping space for clamping the sealing ring. For feeding the sealing ring through between the supporting rings the clamping space is open radially inside, by way of an annular gap, relative to a system center axis. The sealing ring comprises a radially outer clamping section for accommodating, in the clamping space, a radially inner sealing lip for directly or indirectly resting against the shaft, and a connecting web for connecting the sealing lip to the clamping section. According to the invention, opposing corner regions, located radially inside, of the clamping space are formed by inclined run-on surfaces that diverge when viewed from the annular gap radially towards the outside. The clamping section of the sealing ring comprises two opposite edge regions that are formed by inclined surfaces and that correspond to the run-on surfaces.

As a result of the run-on surfaces and the corresponding inclined surfaces, during installation the sealing ring is automatically moved to its desired position so that proper installation is made possible and partial squeezing of the clamping section out of the clamping space is prevented. At the same time rotation of the sealing ring, during operation, from its desired position is, however, prevented. Thus reliable proper installation and reliable positional securing of the sealing ring are made possible, and consequently a very good sealing effect is achieved. For example, a rubber material, such as an elastomer, is used as the material of the sealing ring. A preferred Shore-A-value hardness ranges from 80 to 85.

In order to achieve simple installation in both axial directions of installation and in order to achieve centering of the sealing ring on both sides, it is advantageous if both run-on surfaces and both inclined surfaces are equal in size and/or are oriented at the same angle relative to the system center axis. Preferably, the angle ranges from 40° to 50° relative to the symmetry axis. In particular, in each case the angle is 45° relative to the system center axis.

Since shafts of different external diameters require sealing rings of different internal diameters it is advantageous if the run-on surfaces and the inclined surfaces have a radial extension relating to a shaft diameter. Preferably, the radial extension of the run-on surfaces and of the inclined surfaces is calculated according to the formula h=0.0013×shaft diameter+(0.9 to 1.3).

Furthermore, it has been shown to be advantageous if the clamping section has a greater radial extension and/or axial extension than the clamping space. Preferably, the clamping section and the clamping space have an identical radial extension or height, whereas the clamping section has a greater axial extension or width, preferably by 8% to 15%, in particular of 10% to 12%, than the clamping space. The clamping section preferably has a width-to-height ratio of 1.2 to 2.0, in particular of 1.5 to 1.7.

For optimizing spring characteristics or the elastic behavior of the connecting web and of the sealing lip it is advantageous if they are of uniform thickness over their respective effective spring length. Preferably, a length-to-width ratio of the connecting web ranges from 3.2 to 5.3, in particular between 3.5 and 4.5, and a length-to-width ratio of the sealing lip ranges from 1.3 to 2.5, in particular between 1.6 and 2.3.

Furthermore, in terms of the spring characteristics it has been shown to be advantageous if the connecting web is at least as long as, preferably longer than, the sealing lip. Preferably, the length ratio of the connecting web to the sealing lip is in a value range of 1.0 to 3.0 and more preferably between 1.25 to 2.5, in particular between 1.4 and 1.7.

The elastic behavior of the sealing lip can be further improved if an encompassed angle between the connecting web and the sealing lip is between 90° and 110° in the relaxed state of the sealing ring. Preferably, the angle is between 95° and 105°.

In order to protect the sealing lip in the case of overpressure, a multitude of lubrication pockets can be formed on the bottom side of the sealing lip, which lubrication pockets are open towards the low-pressure side of the sealing system. The lubrication pockets are preferably evenly distributed over the internal circumference and comprise an increased depth from their mouth to their base. As an alternative or in addition, they are wedge-shaped, rectangular or the like in the axial direction. In operation the lubrication pockets contain a fluid on the low-pressure side, wherein as a result of the increasing depth their respective mouth region is reduced in cross section. During the sudden rise in pressure on the high-pressure side, the narrowing mouth region prevents the fluid from being immediately pressed out of the lubrication pockets. The fluid quasi banks-up upstream of the mouth region in the lubrication pockets where it acts as a local supporting element, and consequently strong deformation of the sealing ring is prevented.

In this arrangement it has been shown to be advantageous if a distance of the lubrication pockets from a sealing edge of the sealing lip relates to the shaft diameter. In particular, it has been shown to be advantageous if the distance is calculated according to the formula a=0.004×shaft diameter+(2.1 to 3.1).

A sealing ring according to the invention for such a sealing system comprises a clamping section with two opposite edge regions formed by inclined surfaces that correspond to run-on surfaces on the side of the housing or on the side of the clamping space. Such a sealing ring can be properly installed in a corresponding sealing system and reliably maintains its desired position.

Other advantageous exemplary embodiments of the invention form part of further subordinate claims.

BRIEF DESCRIPTION OF THE DRAWINGS

In the following Figures a preferred exemplary embodiment of the invention is explained with reference to diagrammatic illustrations, as follows.

DETAILED DESCRIPTION OF THE PREFERRED EMBODIMENTS

Figure 1:
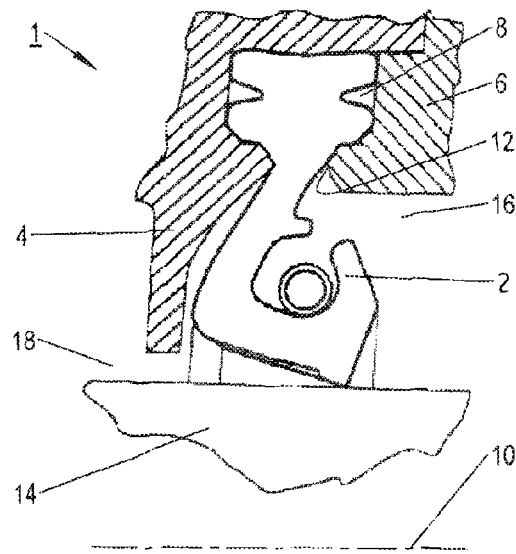
FIG. 1 shows a sealing system according to the invention, comprising a sealing ring in the installed position in a first operating position of its connecting web.
Figure 2:
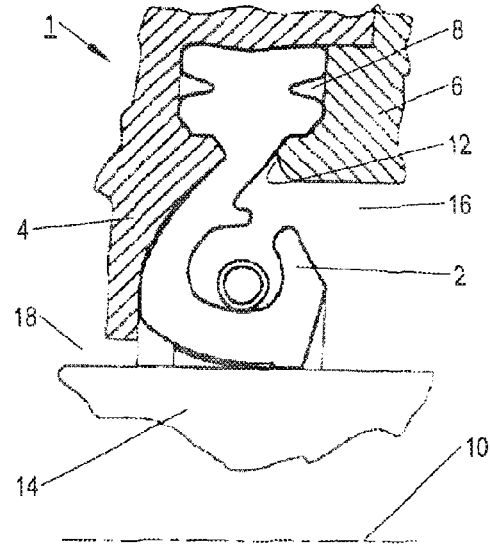
FIG. 2 shows the sealing system according to FIG. 1, comprising the sealing ring in a second operating position of the connecting web.

An exemplary sealing system 1 according to the invention, which sealing system 1 is shown in FIGS. 1 and 2, for sealing shafts 14 against liquid media, for example propeller shafts, impeller shafts, rudder stocks of ships, and the like, essentially comprises a sealing ring 2 and a first supporting ring 4 on the side of the housing, and a second supporting ring 6 on the side of the housing. The supporting rings 4, 6 delimit a clamping space 8 in which the sealing ring 2 is clamped. The sealing ring 2 leads from the clamping space 8 by way of an annular gap 12, which is situated radially inside, and sealingly rests against the shaft 14 to be sealed, or against a bearing bushing installed on the shaft 14, which shaft 14 rotates on its longitudinal axis that extends so as to be aligned with the system center axis 10. The sealing ring 2 in particular separates a high-pressure side 16 from a low-pressure side 18 or prevents liquid from flowing from the high-pressure side 16 to the low-pressure side 18. In FIGS. 1 and 2 and in the following FIGS. 3 to 18 terms such as radial and axial always relates to the system center axis 10 and thus to the rotary axis of the shaft.

Figure 3:
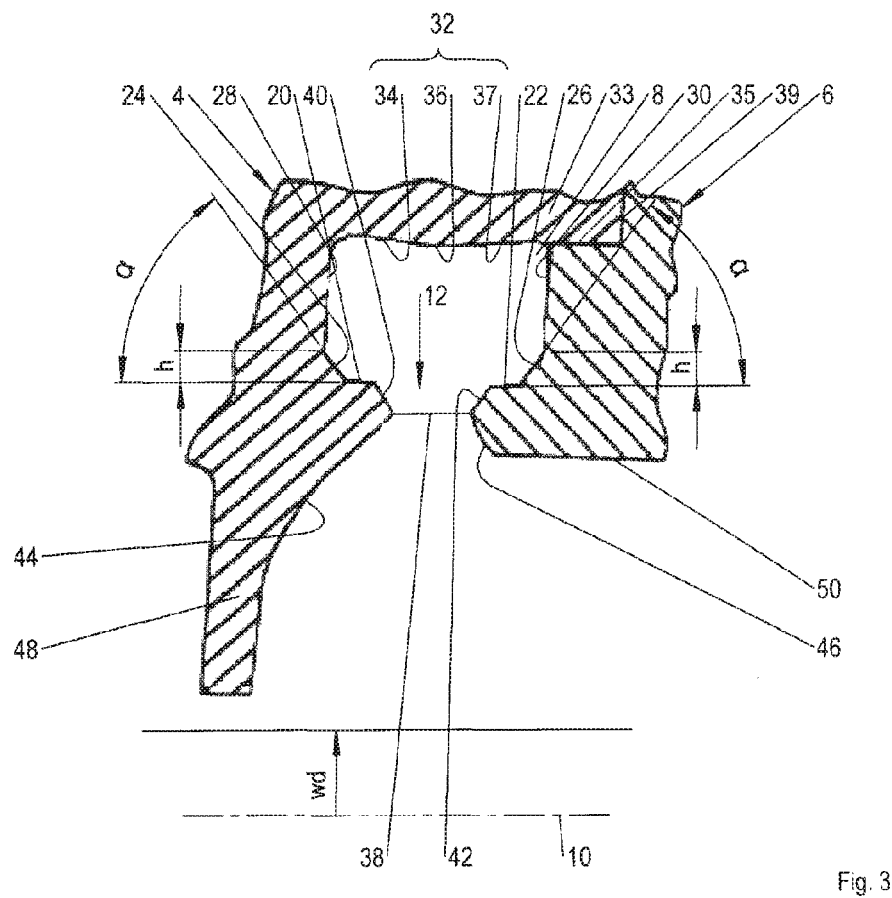
FIG. 3 shows an individual view of a housing region of the sealing system.

According to the individual view of the interlocking supporting rings 4, 6 in FIG. 3, the clamping space 8 comprises a radially inner first bottom surface 20 and a radially inner second bottom surface 22. The bottom surfaces 20, 22 are aligned so as to be parallel to the system center axis 10 and are spaced apart from each other by way of the annular gap 12. The first bottom surface 20 makes a transition to a first run-on surface 24, and the second bottom surface 22 makes a transition to a second run-on surface 26.

The run-on surfaces 24, 26 are in each case angled so as to be inclined to the system center axis 10, wherein starting from their respective bottom surface 20, 22 said run-on surfaces 24, 26 are oriented radially outwards. They form two opposite corner regions of the clamping space 8 and in each case have an identical axial length, an identical angle of incidence to the system center axis 10 and an identical height or radial extension. Preferably, they are oriented at an angle a of 45° to the system center axis 10 so as to be opposite each other and comprise a height relating to the shaft diameter Wd in the region of the sealing system 1. In particular, they have a height h that is dimensioned according to the formula h=0.0013×Wd+(0.9 to 1.3). The run-on surfaces 24, 26 in each case make a transition to a first sidewall 28 and to a second sidewall 30.

The sidewalls 28, 30 essentially extend radially or perpendicularly to the system center axis 10. In the exemplary embodiment shown in the diagram the first sidewall 28 makes a transition to a ceiling surface 32 of the first supporting ring 4, which ceiling surface 32 is formed by an axial projection 33 of the clamping space 8. In the installed state of the sealing ring 2 the axial projection 33 is in axial overlap with a shoulder surface 35 of the second supporting ring 6, which shoulder surface 35 is arranged radially inside relative to the axial projection 33 and extends so as to be parallel or almost parallel to the system center axis 10. The second sidewall 30 extends to the shoulder surface 35, thus in the installed state of the sealing ring 2 adjoining the ceiling surface 32. As shown in the exemplary embodiment according to FIGS. 16, 17 and 18, the axial projection 33 can, however, also be formed on the second supporting ring 6, and the shoulder surface 35 can be formed on the first supporting ring 4. This is essentially guided by the direction of installation.

As indicated in FIG. 3, the ceiling surface 32 comprises a central surface offset 36, which relative to its connecting corners with the sidewalls 28, 30 is offset radially inwards, which surface offset 36 extends so as to be parallel or almost parallel to the system center axis 10. The surface offset 36 is arranged between a first inclined partial surface 34 and a second partial surface 37, oriented in the opposite direction, of the ceiling surface 32, thus interconnecting said partial surfaces 34, 37.

An axial extension or width B of the clamping space 8 is delimited in that the axial projection 33 runs onto an opposite annular front surface 39 of the supporting ring 6, which in this diagram is the second supporting ring.

The annular gap 12 comprises a narrowest cross section 38, which is radially enlarged towards the outside, in the direction of the bottom surfaces 20, 22, by way of an inclined first gap surface 40 and an inclined second gap surface 42. Starting from the narrowest cross section 38 radially inwards the annular gap 12 is expanded by way of opposite arch surfaces 44, 46 of the supporting rings 4, 6. In this arrangement the arch surface 44 of the first supporting ring 4 is a concave support surface or end-stop surface formed by an extension 48 that extends opposite the second supporting ring 6 radially in the direction of the system center axis 10. As shown in FIG. 2, the arch surface 44 forms an end stop for a connecting web 56 or a membrane of the sealing ring 2 with elastic deformation. The arch surface 46 of the second supporting ring 6 is convex, with its radius being smaller than that of the arch surface 44 of the first supporting ring 4. Said arch surface 46 makes a transition to an internal circumferential surface 50 that extends so as to be parallel to the system center axis 10.

Figure 4:
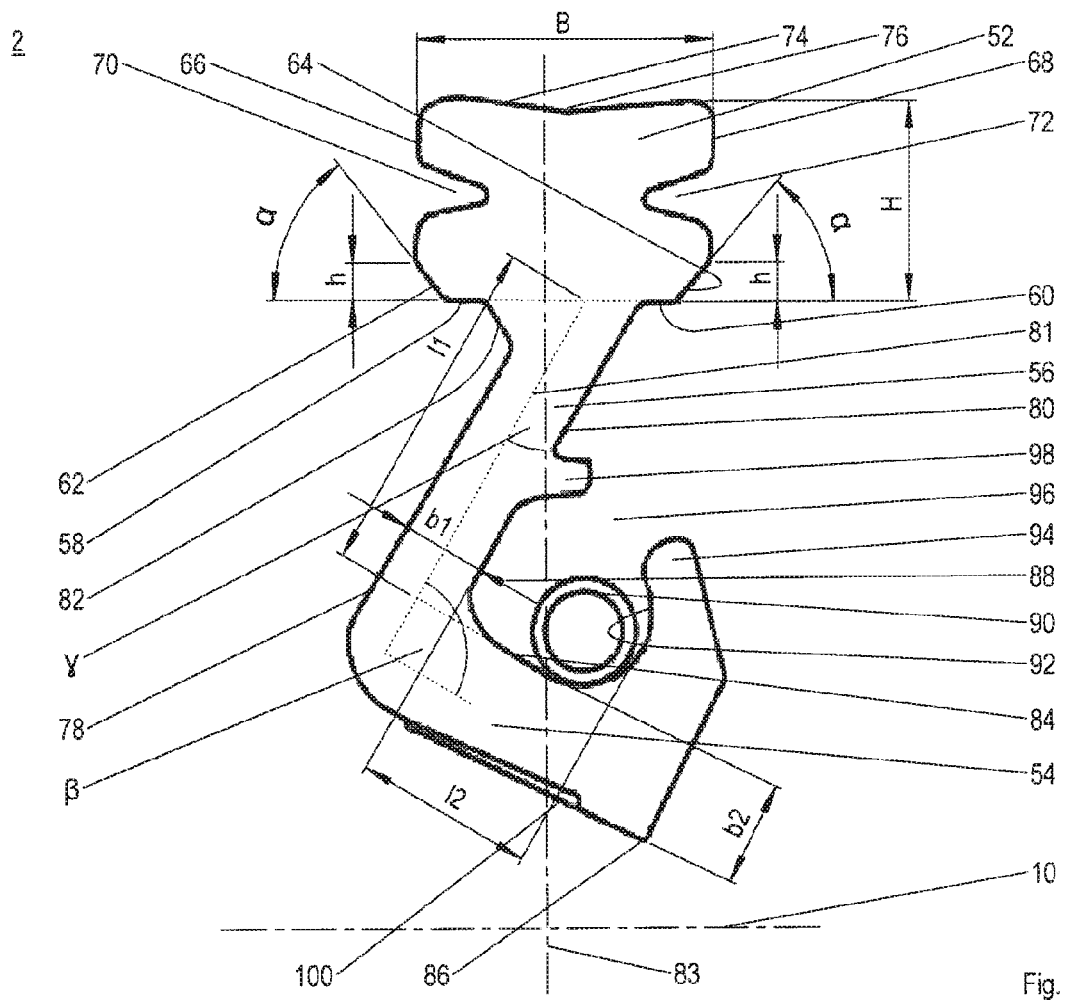
FIG. 4 shows an individual view of the sealing ring.

As shown in FIG. 4, the sealing ring 2 comprises a radially outer clamping section 52, a radially inner sealing lip 54 and the above-mentioned connecting web 56 that interconnects the clamping section 52 and the sealing lip 54. The sealing ring 2 comprises a rubber-like material, in particular an elastomer. Preferably, the sealing ring 2 has a Shore hardness A ranging from 80 to 85.

The clamping section 52 serves to accommodate the sealing ring 2 in the clamping space 8. It has an almost rectangular cross section with a first internal circumferential surface 58 and with a second internal circumferential surface 60, which surfaces are separated from each other by the connecting web 56.

In the installed state the internal circumferential surfaces 58, 60 extend parallel to the system center axis 10; in each case they make a transition to a first inclined surface 62 or to a second inclined surface 64.

In each case the inclined surfaces 62, 64 are oriented from the internal circumferential surface 58, 60 radially outwards, and in particular they are designed so as to correspond to the run-on surfaces 24, 26 of the clamping space 8. They form two opposing edge regions of the clamping section 52 and thus in each case have an axial length that corresponds to that of the run-on surfaces 24, 26, an angle of incidence $\alpha$, which is preferably oriented in the opposite direction, to the system center axis 10 of 45° and an identical height h or radial extension, which relates to the shaft diameter Wd and is dimensioned according to the formula $h=0.0013 \times Wd+(0.9 \text{ to } 1.3)$. The first inclined surface 62 makes a transition to a first annular surface 66, and the second inclined surface 64 makes a transition to a second annular surface 68.

The annular surfaces 66, 68 are oriented so as to be perpendicular to the system center axis 10, and in particular corresponding to the first sidewall 28 or second sidewall 30 of the clamping space 8. In each case they comprise an axial indentation 70, 72 that extends at approximately half the height of the clamping section 52. The indentations 70, 72 are thus oriented opposite each other, wherein, when viewed in the axial direction from the annular surfaces 66, 68, they taper off in opposite directions in a wedge-shaped manner The annular surfaces 66, 68 make a transition to an external circumferential surface 74 that extends between them.

The external circumferential surface 74, which towards the center of the clamping section corresponding to the ceiling surface 32 comprises two inclined partial surfaces that are angled in the opposite direction relative to each other, correspondingly to the ceiling surface 32 comprises a central surface depression 76. The surface depression 76 is designed so as to correspond to the surface offset 36 of the ceiling surface 32 of the clamping space 8, thus extending so as to be parallel or almost parallel to the system center axis 10.

Preferably, the clamping section 52 has a width-to-height ratio of 1.5 to 1.7, wherein the width B extends in the axial direction, and the height H extends in the radial direction. In particular, the clamping section 52 and the clamping space 8 are identical in height, whereas the clamping section 52 has a width B that is greater by 10% to 12% than the clamping space 8. Consequently, the sealing ring can be inserted without stress or almost without stress into the open clamping space and is tightened or compressed in the axial direction only during axial closing, as a result of the supporting rings being moved together.

Starting from the internal circumferential surfaces 58, 60 the connecting web 56 is guided radially inwards and on the low-pressure side axially beyond the clamping section 52. An angle $\gamma$ between the connecting web 56 or its center line 81 and a radially extending line 83, which according to the diagram in FIG. 4 is perpendicular, in the direction of the low-pressure side 18 is between 25° and 35°. The connecting web 56 has a first web surface 78, on the low-pressure side, and an opposite, second, web surface 80, on the high-pressure side. The web surfaces 78, 80 extend so as to be parallel or almost parallel to each other so that the connecting web 56 essentially over its spring length or length l1 has a constant width b1 or a constant cross section. The length is measured along its center line 81. Preferably, a length-to-width ratio of the connecting web 56 is 3.2 to 5.3. In the transition region from the clamping section 52 to the connecting web 56 the connecting web 56 on the low-pressure side is increased by way of an inclined transition surface 82 formed so as to correspond to the first inclined gap surface 40 of the first supporting ring 4. Consequently, the connecting web 56 in the transition region rests against the first supporting ring 4, thus resulting in stabilization of the transition region (FIGS. 1 and 2). The length l1 is essentially measured from a virtual connecting line between the internal circumferential surface 58, 60 in the direction of a virtual extension of a spring-space delimitation surface 84, on the high-pressure side, of the sealing lip 54. The connecting web 56 is longer than the sealing lip 54, or the sealing lip 54 is shorter than the connecting web 56. A preferred length ratio of the connecting web 56 to the sealing lip 54 is essentially in a value range of $11:12=1.25$ to 2.5, or a length ratio of sealing lip 54:connecting web 56 is $12:11=0.4$ to 0.8 ratio 0.4 to 0.8.

Starting from the connecting web 56 the sealing lip 54 is angled radially inwards in the opposite axial direction relative to the connecting web 76. On the high-pressure side said sealing lip 54 extends from the connecting web 56 preferably at an angle $\beta$ of 90° to 110°. The extension of the sealing lip 54 is such that its sealing edge 86 is axially set back relative to the second annular surface 68 of the clamping section 52. Apart from marginal regions, in the region of its spring-space delimitation surface 84, and thus over its spring length or length l2, said sealing lip 54 has a constant width b2 and thus a constant cross section. Preferably, a length-to-width ratio of the sealing lip 54 is 1.3 to 2.5.

The spring-space delimitation surface 84 delimits a spring space 88 radially inside. The spring space 88 is used to accommodate an annular spring 90 and is formed so as to be situated radially outside the sealing lip 54. Said spring space 88 is delimited in the axial direction by the second web surface 80 of the connecting web 56 and by an opposite concave hook surface 92 of a hook section 94 that extends on the end from the sealing lip 54 radially inwards. The annular spring is used to increase a contact force of the sealing edge 86. In order to decrease an introduction gap 96 for the annular spring 90, on the second web surface 80 of the connecting web 56 an axial projection 98 is arranged that extends radially outwards to the hook section 94.

Figures 5, 6:
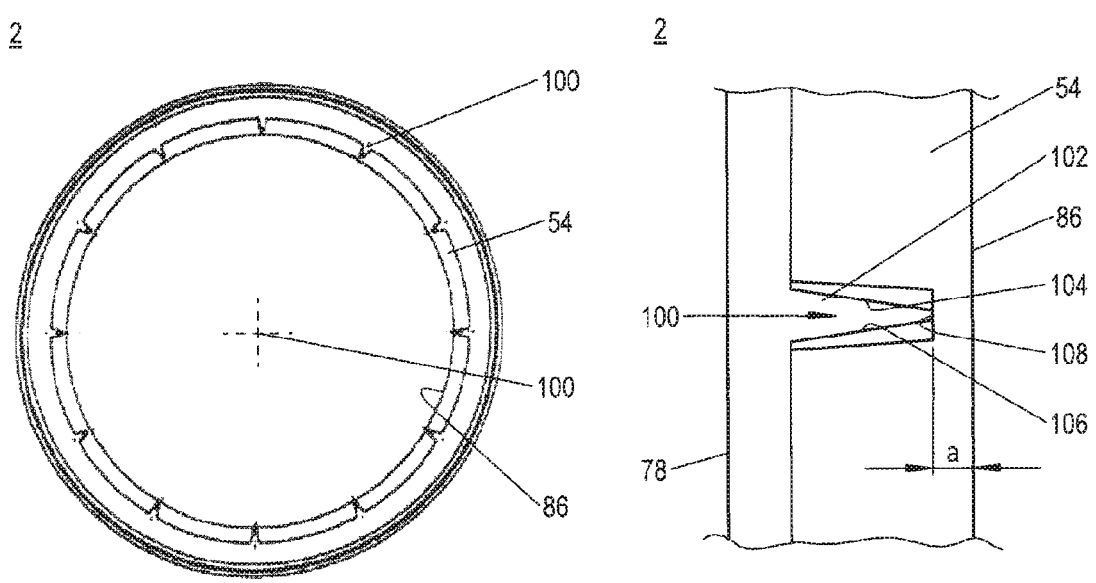
FIG. 5 shows an axial view of the sealing ring, showing lubrication pockets on the side of the sealing lip.
FIG. 6 shows a detailed view of the lubrication pockets.

Towards the bottom the sealing lip 54 comprises a multitude of lubrication pockets 100 that are open on the low-pressure side. As shown in FIG. 5, the lubrication pockets 100 are evenly spaced apart over the internal circumference of the sealing lip 54. Said lubrication pockets 100 are wedge-shaped in the axial direction and in the axial direction are spaced apart from the sealing edge 86 and from the web surface 78 on the low-pressure side. As shown in FIG. 6, said lubrication pockets 100 are situated at a distance a from the sealing edge 86, which distance is relative to the shaft diameter Wd. Preferably, the distance a is calculated according to the formula $a=0.004 \times Wd+(2.1$ to $3.1)$. The lubrication pockets 100 essentially comprise a radially outer pocket ceiling 102, two opposite pocket flanks 104, 106, and a pocket base 108.

Figure 7:
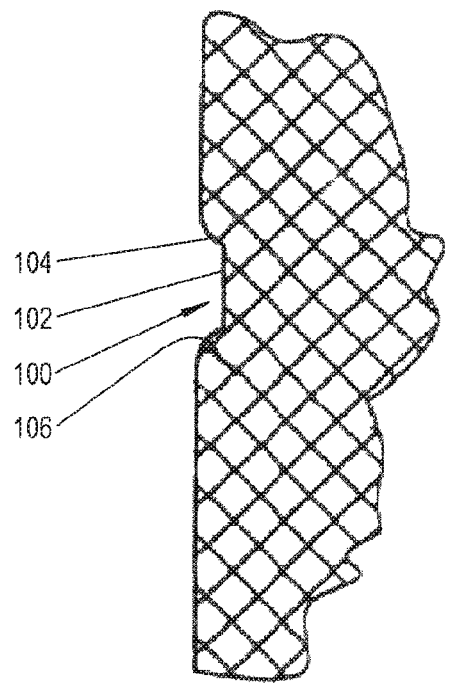
FIGS. 7, 8 and 9 show variations of pocket flanks of the lubrication pockets.
Figure 8:
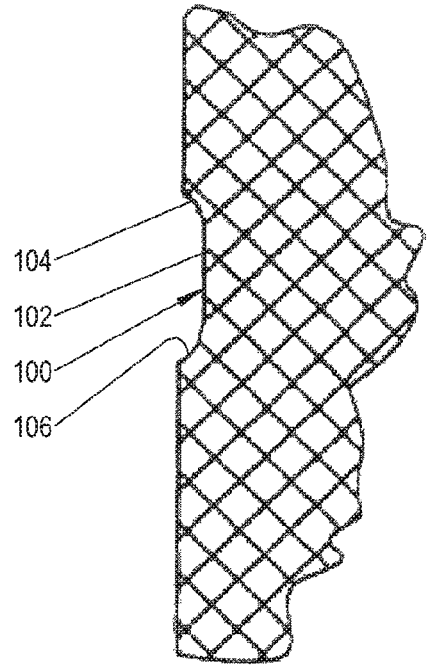
Figure 9:
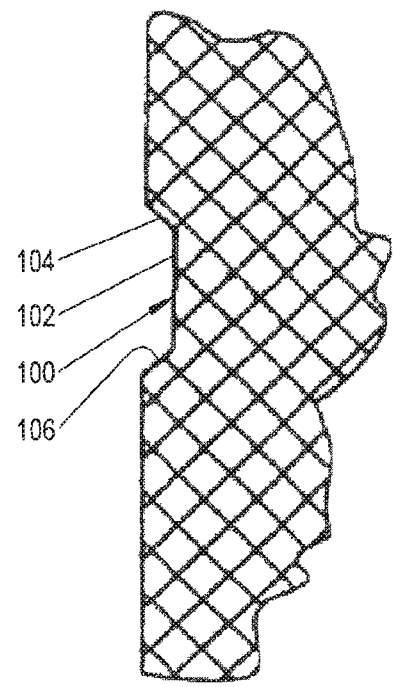

According to the section views in FIGS. 7, 8 and 9, the pocket ceiling 102 is preferably planar in design. In contrast to this, the pocket flanks 104, 106 are in each case matchingly concave, convex or inclined.

Figure 10:
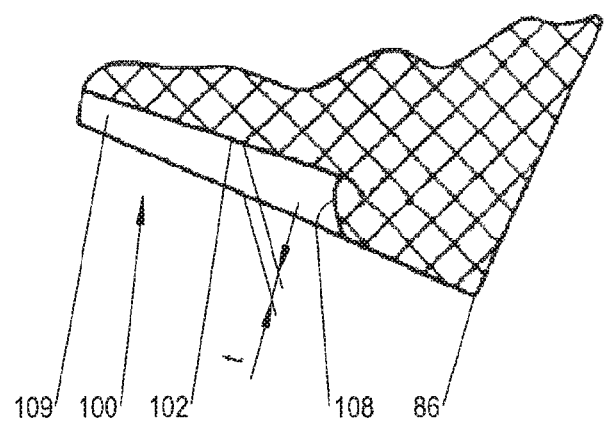
FIGS. 10, 11 and 12 show variations of a pocket base of the lubrication pockets.
Figures 11, 12:
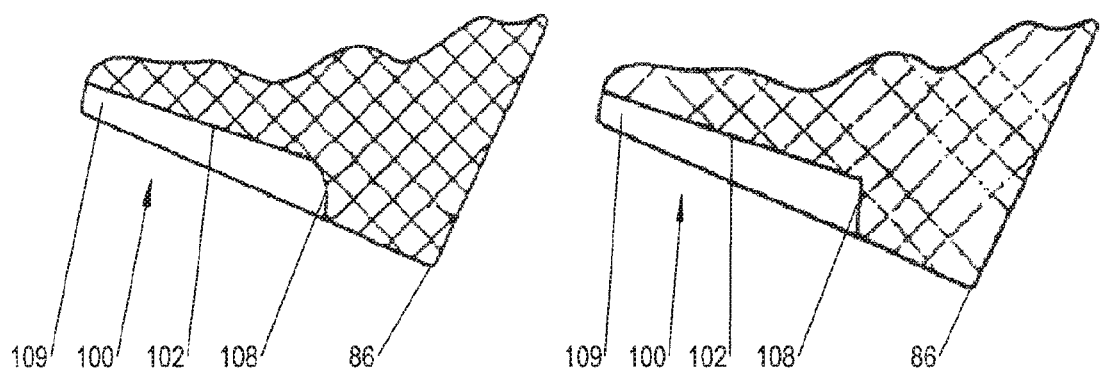

According to the section views in FIGS. 10, 11 and 12, the pocket base 108 can be designed so as to be convex, concave or inclined, analogously to the pocket flanks 104, 106. Irrespective of the shape of the pocket flanks 104, 106 and/or of the pocket base 108, in the design of the lubrication pockets 100 it is essential that, as shown in FIGS. 10, 11 and 12, the depth t of the lubrication pockets 100 increases from their mouth region 109 on the low-pressure side in the direction of their pocket base 108. In operation the lubrication pockets 100 comprise a fluid on the low-pressure side, wherein as a result of the increasing depth t their respective mouth region 109 has a reduced cross section. During a sudden increase in pressure on the high-pressure side 16 the narrow mouth region 109 prevents the fluid from being pressed immediately out of the lubrication pockets 100. The fluid quasi banks up in the lubrication pockets 100 upstream of their mouth regions 109 where it acts as a local supporting element, and, consequently, substantial deformation of the sealing ring 2 and/or excessive contact between the sealing edge 86 and the shaft 14 or the bearing bushing are/is prevented, which has a reducing effect on wear of the sealing edge 86 and thus of the sealing lip 54.

Figures 13, 14:
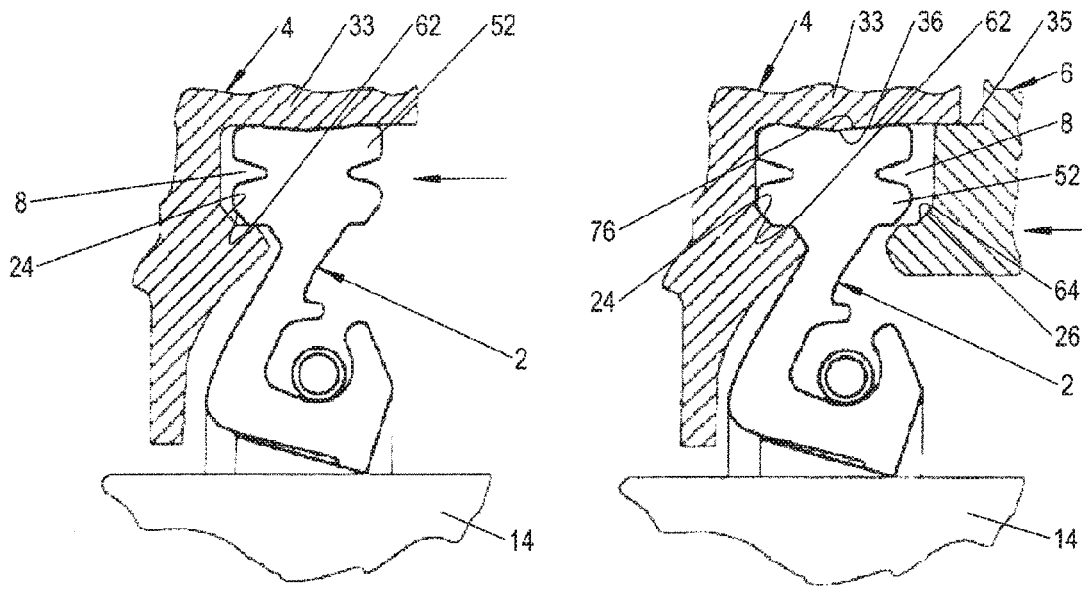
FIGS. 13, 14 and 15 show an assembly of the sealing system in a first direction of installation.
Figure 15:
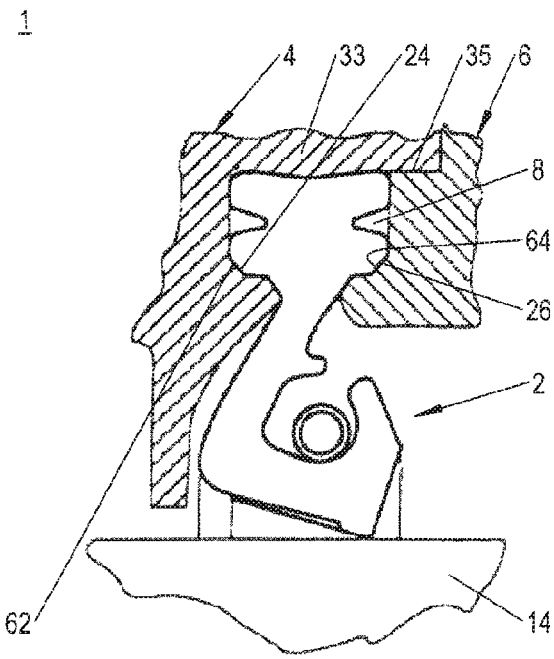
Figure 16:
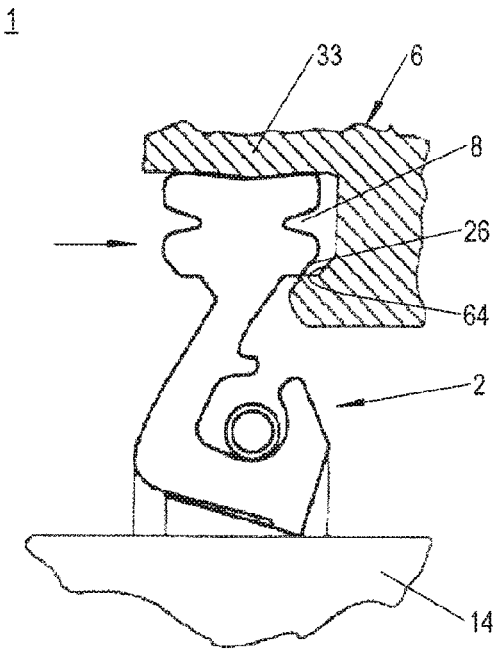
FIGS. 16, 17 and 18 show an assembly of the sealing system in a second direction of installation, which is oriented in the opposite direction of the first direction of installation.
Figure 17:
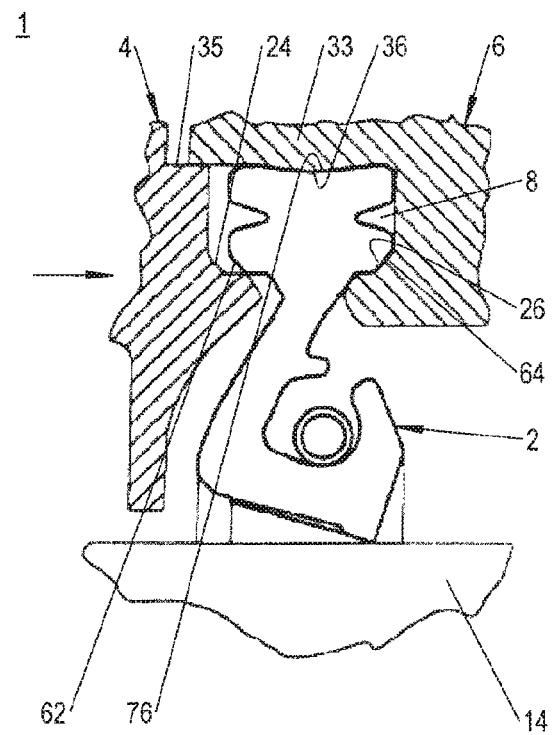
Figure 18:
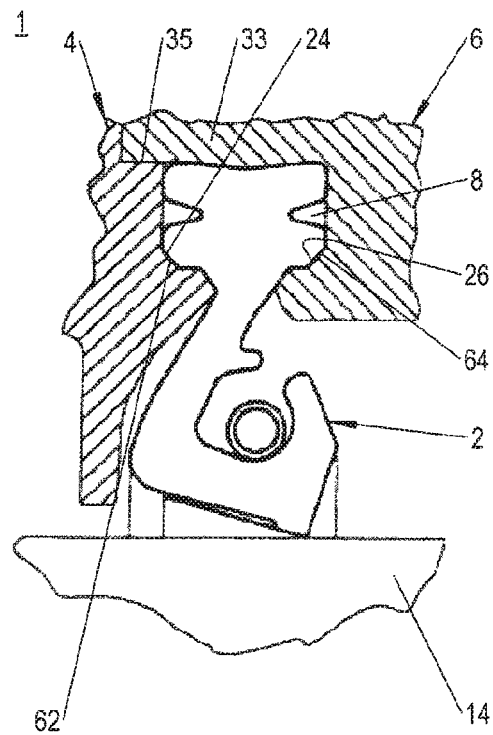

FIGS. 13, 14 and 15 show a method of installing the sealing system 1 in a first direction of installation. FIGS. 16, 17 and 18 show a method of installation in a second direction of installation, i.e. in the opposite direction. The essential difference between these two methods of installation is as follows. In the first method of installation according to FIGS. 13, 14 and 15 the sealing ring 2 is first positioned on the first supporting ring 4 in the axially open clamping space 8, and only after such positioning is the clamping space 8 axially closed by means of the second supporting ring 6. In contrast to this, in the second method of installation the sealing ring 2 with its clamping section 52 is first positioned relative to the second supporting ring 6 in the axially open clamping space 8, and after such positioning the clamping space 8 is axially closed by means of the first supporting ring 4.

In order to prevent the sealing ring 2 from varying its relative position to the supporting ring 4 or 6 that accommodates it, while the clamping space 8 is axially open, the axial projection 33 is preferably provided on the supporting ring 4 or 6 on which the sealing ring 2 is first positioned. According to the first direction of installation, shown in FIGS. 13, 14 and 15, the axial projection 33 is thus provided on the first supporting ring 4, and the shoulder surface 35 is provided on the second supporting ring 6. In FIGS. 16, 17 and 18, which show installation in the opposite direction, the axial projection 33 is thus provided on the second supporting ring 6, and the shoulder surface 35 is provided on the first supporting ring 4.

The two methods of installation clearly show that because of the provision of the inclined run-on surfaces 24, 26 on the housing side, and the corresponding provision of the inclined surfaces 62, 64 on the sealing ring side, proper, and in addition self-centering, installation of the sealing ring 2 relative to the supporting rings 4, 6 or to the clamping space 8 becomes possible, irrespective of the sequence of installation of the supporting rings 4, 6 and irrespective of the direction of installation of the sealing ring 2. The almost rectangular shape of the clamping space 8 and of the clamping section 52 result in positionally securing the sealing ring 2 in its desired position during operation. As a result of engagement of the surface offset 36, on the ceiling side, of the clamping space 8 in the surface depression 76, on the side of the external circumference, of the clamping section 52, as explained above, a kind of locking with positive fit occurs in the open state of the clamping space 8, which also facilitates proper installation. Of course, the surface offset 36 and the surface depression 76 can also be designed in some other manner, for example in the form of an edge and a corresponding depression, wherein both the ceiling surface and the clamping section can comprise the edge or the depression. As a result of the clamping section 52 and the clamping space 8 being equal in height H, the clamping section 52 however having a wider width B than the clamping space 8, the sealing ring 2 is inserted without stress or almost without stress into the open clamping space 8 and is tightened or compressed in the axial direction only during axial closing, as a result of the supporting rings 4, 6 being moved together.

Disclosed is a sealing system for sealing shafts against liquid media, for example propeller shafts, impeller shafts, rudder stocks of ships, and the like, whose opposing corner regions, located radially inside, of a clamping space for clamping at least one sealing ring are formed by inclined run-on surfaces that diverge when viewed from the annular gap radially towards the outside, wherein for accommodation in the clamping space a clamping section of the sealing ring comprises two opposite edge regions that are formed by inclined surfaces and that correspond to the run-on surfaces, as well as a sealing ring for such a sealing system.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A sealing system for sealing shafts against liquid media, comprising:
   at least one sealing ring and supporting rings surrounding the shaft, which supporting rings form a clamping space for clamping the sealing ring, which clamping space is open radially inside, by way of an annular gap, relative to a system center axis between the supporting rings, for feeding the sealing ring through, wherein the sealing ring comprises:
  a radially outer clamping section for accommodating, in the clamping space, a radially inner sealing lip for directly or indirectly resting against the shaft, and
  a connecting web for connecting the sealing lip to the clamping section, wherein opposing corner regions, located radially inside, of the clamping space are formed by inclined run-on surfaces that diverge when viewed from the annular gap radially towards the outside, wherein the radially outer clamping section comprises two opposite edge regions that are formed by inclined surfaces that correspond to the run-on surfaces, wherein the annular gap comprises two opposite inclined gap surfaces diverging radially towards the outside, and wherein each of the run-on surfaces is separated from a respective one of the gap surfaces by a respective bottom surface which are aligned parallel to a system center axis and spaced apart from each other by way of the annular gap.

2. The sealing system according to claim 1, wherein both run-on surfaces and both inclined surfaces are equal in size.

3. The sealing system according to claim 1, wherein both run-on surfaces are oriented at the same angle relative to the system center axis.

4. The sealing system according to claim 1, wherein the run-on surfaces and the inclined surfaces have a radial extension relating to a shaft diameter $W_d$ in that the run-on surfaces have a height h dimensioned according to the formula $h=0.0013 \times W_d+(0.9$ to $1.3)$.

5. The sealing system according to claim 1, wherein the clamping section has a greater radial extension than the clamping space.

6. The sealing system according to claim 1, wherein the clamping section has a greater axial extension than the clamping space.

7. The sealing system according to claim 1, wherein the connecting web and the sealing lip essentially are of uniform thickness over their respective length.

8. The sealing system according to claim 1, wherein the connecting web is at least as long as the sealing lip.

9. The sealing system according to claim 1, wherein an encompassed angle between the connecting web and the sealing lip is between 90° and 110° in the relaxed state of the sealing ring.

10. The sealing system according to claim 1, wherein a multitude of lubrication pockets are formed on the bottom side of the sealing lip, which lubrication pockets are open towards a low-pressure side of the sealing system.

11. The sealing system according to claim 1, wherein a distance a of the lubrication pockets from a sealing edge of the sealing lip relates to the shaft diameter $W_d$ by the formula $a=0.004 \times W_d+(2.1$ to $3.1)$.

12. A sealing ring for a sealing system according to claim 1.

* * * * *